United States Patent [19]

Reeves

[11] 3,960,281
[45] June 1, 1976

[54] MEANS FOR PREVENTING DRY BURN IN A PAPER PLASTIC DUNNAGE BAG

[76] Inventor: Robert L. Reeves, Pinecrest Circle Drive, Sheridan, Ark. 72105

[22] Filed: Nov. 1, 1974

[21] Appl. No.: 520,014

[52] U.S. Cl. ............................ 214/10.5 D; 105/468
[51] Int. Cl.² ......................................... B60P 7/14
[58] Field of Search ............... 214/10.5 D; 105/468; 9/316; 5/348; 239/524

[56] References Cited
UNITED STATES PATENTS

| | | | |
|---|---|---|---|
| 3,189,283 | 6/1965 | Moore | 239/524 X |
| 3,414,140 | 12/1968 | Feldkamp | 214/10.5 D |
| 3,868,026 | 2/1975 | Baxter | 214/10.5 D |

Primary Examiner—Frank E. Werner
Attorney, Agent, or Firm—Hill, Gross, Simpson, Van Santen, Steadman, Chiara & Simpson

[57] ABSTRACT

A dunnage bag having multiple outer plies of paper and an inner ply of plastic has a baffle means opposite the inflation valve to prevent dry burn constituting either a piece of corrugated paper or a similarly flat member of sufficient included area to baffle substantially all of the air projected through the valve and having an expanded thickness sufficient to separate the confronting surfaces of the plastic ply a discrete distance so that the air stream directed through the valve will be diffused transversely and thereby dissipate any vibratory forces tending to produce a dry burn on the plastic ply.

6 Claims, 4 Drawing Figures

MEANS FOR PREVENTING DRY BURN IN A PAPER PLASTIC DUNNAGE BAG

BACKGROUND OF THE INVENTION

1. The Field of the Invention

This invention relates generally to paper plastic dunnage bags.

2. The Prior Art

In paper plastic dunnage bags heretofore provided, an attempt has been made to prevent dry burn by merely taping an additional piece of plastic in the form of a loose flap on the opposite inside surface of the bladder. That additional flap is intended to prevent the burn of the surfaces attributed to high frequency vibration sometimes developed in the plastic on the initial input of air under pressure into the interior of the bag. Since the polyethylene used in the bladder is a high density polyethylene which is linear in molecular structure, the plastic frequently develops holes or will rupture and tear so that the dunnage bag is incapable of maintaining pressure.

SUMMARY OF THE INVENTION

In accordance with the principles of the present invention, instead of using an ordinary piece of plastic, a square of corrugated paper is utilized or else a square of expanded polyethylene. In either event, the baffle should be a flat member of sufficient included area to baffle substantially all of the air projected through the valve. Moreover, the member, whether corrugated paper or expanded polyethylene, should have sufficient thickness to separate the confronting surfaces of the plastic ply or bladder a discrete distance. Thus, the baffle in the form of either the corrugated paper or the expanded polyethylene will have laterally disposed air passage means for diffusing the air stream directed through the valve transversely of the valve and the plastic ply to dissipate any vibratory forces tending to produce a dry burn effect on the plastic ply.

DESCRIPTION OF THE PREFERRED EMBODIMENTS

Figure 1:
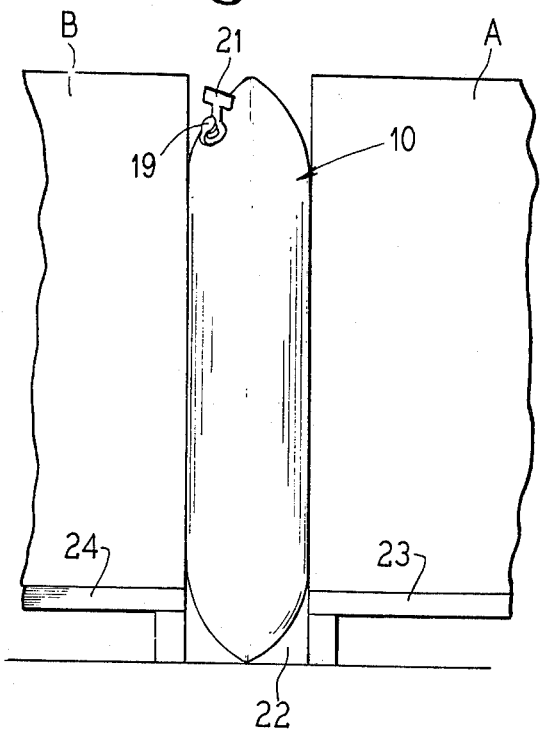
FIG. 1 is a fragmentary elevational view of a paper plastic dunnage bag in a typical use environment.

Referring to FIG. 1, an inflatable disposable paper plastic dunnage bag is shown generally at 10. Such a bag is made from multi-layers of high grade paper, as shown at 11 on FIG. 2, with an inner wall 12 of leak-proof polyethylene film. A valve is shown at 13 and comprises a valve of the automobile tire type wherein an actuate air inflow is permitted with no outflow. Thus, a spring-pressed valve head is shown at 14 which seats against a valve seat 16 and which is carried in a valve body 17. An air inlet 18 can be selectively closed by a snap-in cover 19 carried on the end of an arm 20. A T-shaped handle 21 extends from the other side of the valve member to facilitate manipulation of the valve and the bag during inflation thereof.

In usage, deflated, or partially inflated, bags are simply placed in an open space 22 between a load illustrated in FIG. 1 as constituting any typical load having part A and part B on opposite sides of the space 22 and which parts A and B are loaded on pallets 23 and 24, respectively. Compressed air is then applied to the valve inlet 18 until the required pressure is reached. When the shipment reaches its destination, the bags are simply punctured and discarded.

The inner wall of leak-proof polyethylene film forming the inside bladder of the inflatable dunnage bag is customarily provided as a high density polyethylene which is linear in molecular structure. Thus, when air is initially introduced into the inlet 18 of the valve, there is sometimes a tendency of such airstream to set up vibratory forces and high frequency vibrations which tend to produce holes or ruptures in the polyethylene film. If that occurs, the bag will be prematurely broken and will lose its functional utility. Under the circumstances, some effort has been made to correct such problem which is frequently referred to as "dry burn" by taping a loose flap of polyethylene film on the opposite inside surface of the bladder. However, such loose flap is not completely reliable and may actually be destroyed itself by the vibratory air forces since the flap is so thin as to be practically negligible insofar as its influence on the inrush of air is concerned, when the bag is in a deflated condition.

In accordance with the principles of the present invention, it is contemplated that a baffle means be provided which is of sufficient size to have an included area for baffling substantially all of the air projected through the valve into the interior of the bag. Moreover, such baffle means also has an expanded thickness sufficient to separate the confronting surfaces of the plastic ply or bladder a discrete distance. Moreover, such baffle means is selected and constructed to form laterally disposed air passage means which diffuse the airstream directed through the valve transversely of the valve and the plastic ply to dissipate any vibratory forces tending to produce a dry burn effect on the surface of the plastic ply adjacent the valve outlet.

Figure 2:
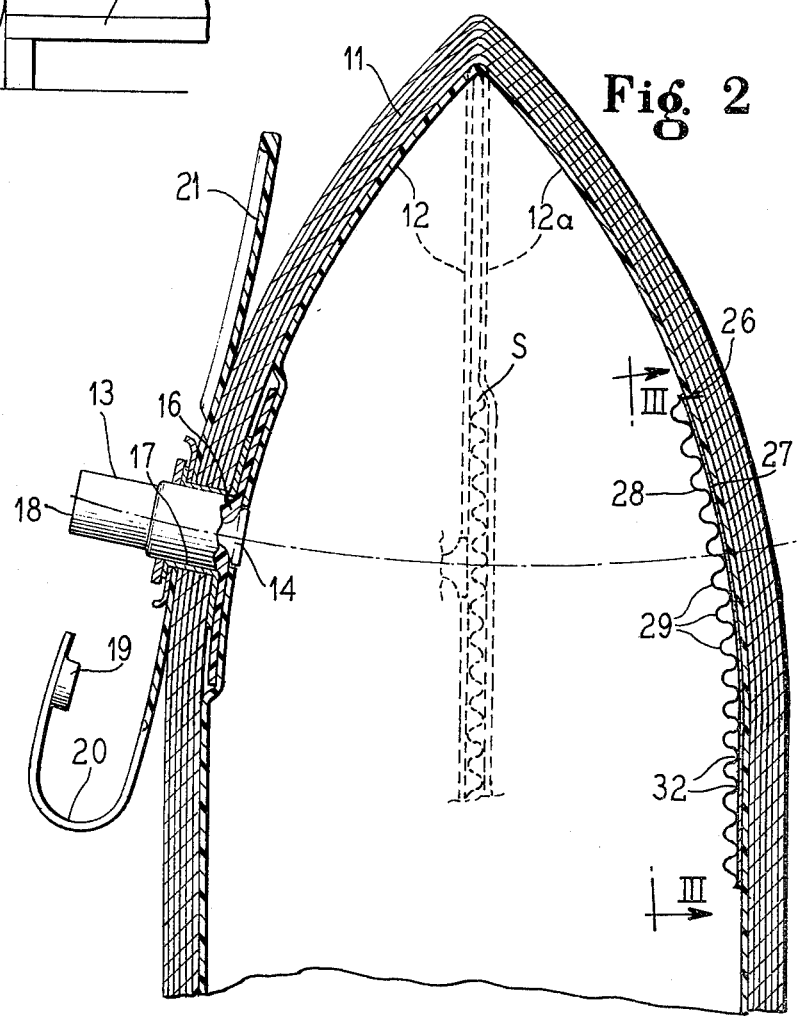
FIG. 2 is an enlarged fragmentary cross-sectional view of the bladder of the bag of FIG. 1 and showing in dotted lines the bag in deflated condition and showing in full lines the bladder and bag in inflated condition to illustrate additional details of the parts.

Referring specifically to FIG. 2, it will be noted there is provided a baffle means shown generally at 26 and constituting a square approximately 3 inches in each direction of corrugated paper. Thus, the baffle means 26 has a backing sheet 27 approximately 3 inches square and the backing sheet has connected thereto in firm assembly therewith a corrugated sheet 28 defining a plurality of individual undulations 29, which project outwardly from the backing sheet 27 a discrete distance.

Figure 3:
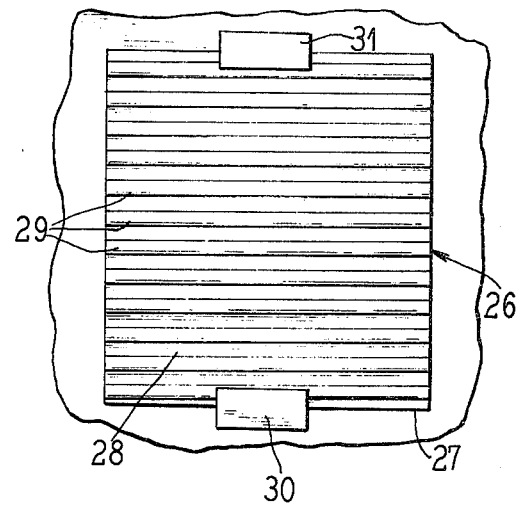
FIG. 3 is an elevational view of the baffle means taken on line III—III of FIG. 2.

As shown in FIG. 3, the baffle means 26 may be secured to the plastic ply oppposite the valve by an adhesive tab shown at 30 and 31, or any other adhesive securement could be utilized. For example, an adhesive medium could be interposed between the backing sheet 27 and the plastic ply. It is also contemplated that the backing sheet could be provided with a pressure-sensitive adhesive or any other well known form of adhesive connection to facilitate the permanent or semi-permanent connection of the baffle means 26 to the plastic ply. Moreover, the baffle means 26 is positioned on the plastic ply opposite the valve head 14. The baffle means 26 is located relative to the valve so that substantially all of the air projected past the valve head 14 will be substantially baffled.

By using the corrugated paper, it will be apparent that even in fully deflated condition, when the plastic plies are in confronting adjacency to one another, the inner position of the undulations 29 of the corrugated sheet 28 will space the plastic plies from one another. For convenience in identification, the plastic ply on the side in which the valve is connected is shown at 12, while the plastic ply opposite thereto is shown at 12a. Thus, as depicted in dotted lines wherein the plies 12 and 12a are shown in deflated condition, the undulations 29 of the corrugated sheet 28 tend to separate the plies by a spacing dimension shown at S.

By virtue of such provision, the corrugations provide a series of air passages shown at 32 which extend transversely relative to the axis of the valve. Accordingly, when air is projected through the valve into the interior of the bag, the baffle means 26 diffuses the airstream through the air passages 32 transversely of the valve and the plastic ply to dissipate any vibratory forces tending to produce a dry burn effect on the surfaces of the plastic ply adjacent the valve outlet.

Good results have been obtained with corrugated paper in a 26 pound weight and utilizing pieces of corrugated paper approximately 3 to 4 inches square.

Figure 4:
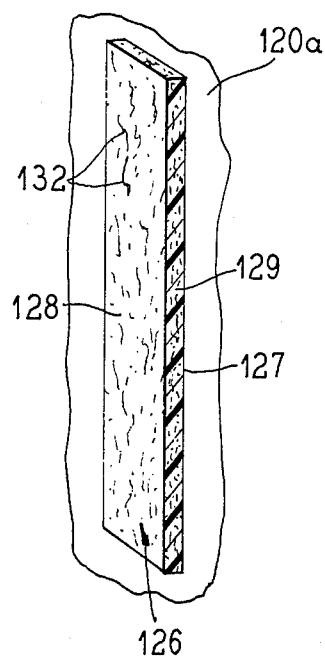
FIG. 4 is a perspective view showing an alternative form of the invention wherein the corrugated paper of FIGS. 3 and 4 is replaced by a square of expanded polyethylene.

Similar baffle means providing the criterion of the present invention, i.e., sufficient size to baffle substantially all of the air projected through the valve and sufficient thickness to separate the confronting surfaces of the plastic ply a discrete distance and sufficient lateral air passage means to diffuse the airstream transversely of the valve into the interior of the bag can also be used. Thus, as shown in FIG. 4, another form of the invention contemplates the utilization of expanded polyethylene. In FIG. 4 there is shown a baffle means 126 which may be adhesively secured to one ply 120a of a dunnage bag bladder. The expanded polyethylene baffle means 126 has a discrete thickness 129 between a first face 127 and a second face 128. It will be apparent that the expanded polyethylene is characterized by randomly disposed transverse air passages 132 which will tend to diffuse the air transversely of any valve through which air is directed towards the sureface 128 of the baffle means 126.

Although various minor modifications might be suggested by those versed in the art, it should be understood that I wish to embody within the scope of the patent warranted hereon all such modifications as reasonably and properly come within the scope of my contribution to the art.

I claim as my invention:

1. An inflatable dunnage bag comprising
   multiple outer plies of paper and an inner ply of plastic formed as a closed inflatable baldder,
   a one-way inflation valve having an inlet end disposed in an accessible location outside of said bag on a wall thereof and having an outlet end projecting inwardly of said plasitc inner ply through said wall to admit air under pressure inside of said bladder,
   means to prevent dry burn when charging said bag with air comprising
      a baffle positioned in register with said outlet end of said valve and being disposed between the confronting surfaces of said plastic inner ply when said bag is in deflated condition,
      said baffle comprising a flat member of sufficient included area to baffle substantially all of the air projected through said valve into the interior of said bag,
      said baffle having an effective expanded thickness at least in an area in register with said outlet end of said valve sufficient to separate said confronting surfaces of said plastic inner ply by a discrete distance when said bag is in deflated condition,
      said baffle further having formed therein laterally and transversely disposed air passage means diffusing the air stream directed through said valve transversely of said valve and said plastic inner ply thereby to dissipate any vibratory forces tending to produce a dry burn effect on the surfaces of said plastic inner ply adjacent said outlet end of said valve,
   and fastening means securing said baffle adjacent to said plastic inner ply on the inner wall confronting surface thereof opposed to that through which said outlet end of said valve so projects.

2. A dunnage bag as defined in claim 1 wherein said means to prevent dry burn comprises corrugated paper having a backng sheet and a corrugated sheet connected thereto and together therewith forming plural fluted passages constituting air passage means for the purposes set forth.

3. A dunnage bag as defined in claim 1 wherein said means to prevent dry burn comprises a sheet of expanded polyethylene having discrete thickness and forming air passage means for the purposes set forth.

4. In an inflatable paper plastic dunnage bag as defined in claim 1,
   said means to prevent dry burn comprising corrugated paper and wherein the corrugations in the corrugated paper constitute the air passage means extending transversely of said valve.

5. In an inflatable paper plastic dunnage bag as defined in claim 1, said means to prevent dry burn comprising a piece of expanded plastic and wherein the transversely extending air passage means are provided in the expanded plastic material.

6. In an inflatable paper plastic dunnage bag as defined in claim 1 and further characterized by said fastening means comprising adhesive means.

* * * * *